July 11, 1933.  E. L. CONNELL  1,917,752
COLLET
Filed July 14, 1931  2 Sheets-Sheet 1
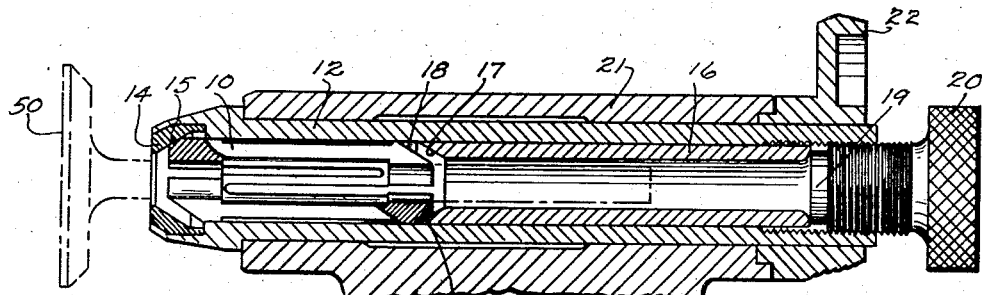
Fig. 1
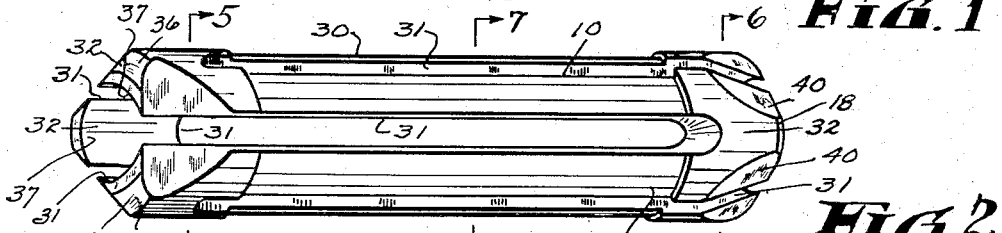
Fig. 2
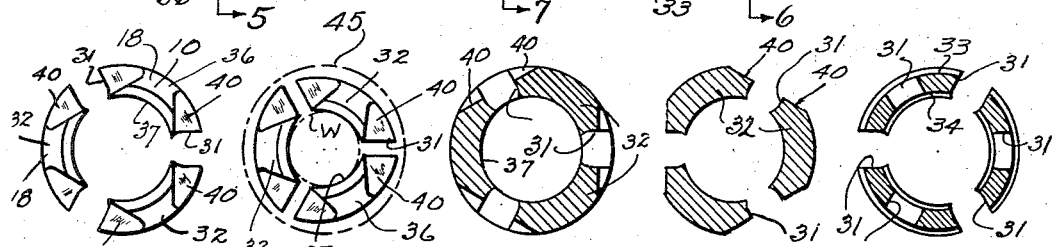
Fig. 3  Fig. 4  Fig. 5  Fig. 6  Fig. 7
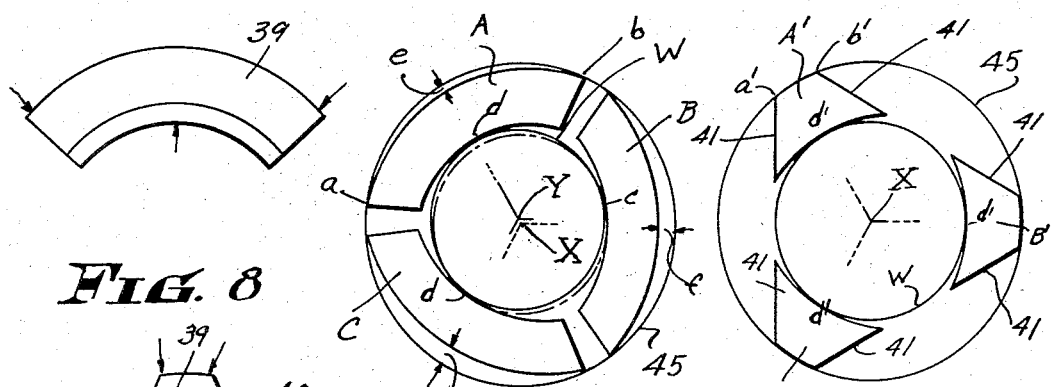
Fig. 8  Fig. 9  Fig. 11
Fig. 10
Inventor
Edwin L. Connell
By Bates, Goldrick & Teare
Attorneys

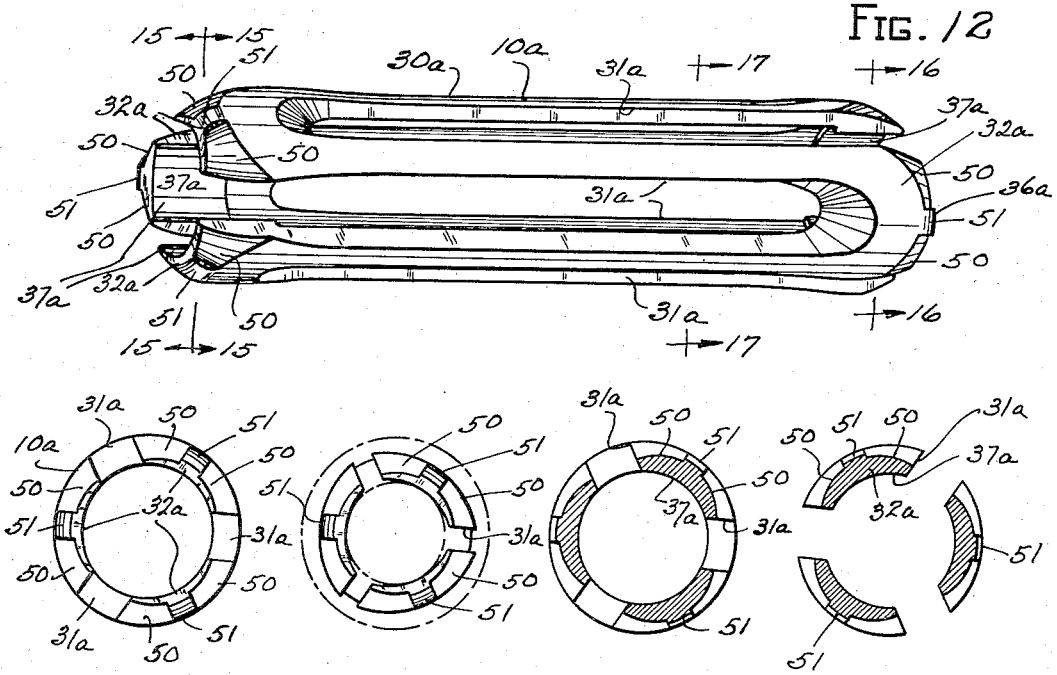

Patented July 11, 1933

1,917,752

UNITED STATES PATENT OFFICE

EDWIN L. CONNELL, OF TOWSON, MARYLAND, ASSIGNOR TO VAN DORN ELECTRIC TOOL COMPANY, OF TOWSON, MARYLAND, A CORPORATION OF OHIO

COLLET

Application filed July 14, 1931. Serial No. 550,670.

This invention relates to an improved collet. The present application constitutes a continuation in part of my application for Letters Patent on a collet and method of making same, Serial No. 457,999, filed May 31, 1930, Patent No. 1,854,825 of Apr. 19, 1932. A collet of the type to which this invention relates generally comprises a hollow tube, having longitudinal slots extending from the alternate ends thereof. The ends are generally tapered or conical, to fit into seats having a corresponding taper. Due to the slots, the ends form a plurality of jaws, which contract or expand relative to the axis of the collet, as one of the seats is moved longitudinally relative to the other seat.

The general object of this invention is to provide a collet adapted to grip objects which vary through a considerable range of diameter, such as the stems of automotive valves, while positioning such objects for rotation with the utmost degree of axial precision.

A more specific object is to provide a collet of such a type that a minimum circumferential surface or frictional area thereof will remain in contact with the collet retaining seat for all contracted or expanded positions of the collet.

Another object is to provide a collet of such a type as will minimize the error in axial alignment of objects gripped thereby, such error resulting from the discrepancies in, the grinding of the tapered seat, the grinding of the tapered ends of the collet or variations in internal strength and characteristics of the metal of the gripping jaws of the collet.

Another object is to provide a collet wherein the contact surfaces between the collet and collet seat will approach radial alignment with the points of contact between the work gripping surfaces of the collet and the work.

Further objects of this invention will become apparent from the specification, reference being had to a preferred embodiment illustrated in the drawings, and the essential features thereof will be set forth in the claims.

Referring again to the drawings, wherein I illustrate a preferred form of my improved collet, Fig. 1 is a longitudinal section through my collet mounted in a spindle mechanism, and illustrates my improved collet in use; Fig. 2 is a perspective of my improved collet; Fig. 3 is an end elevation of my improved collet in its expanded position; Fig. 4 is a view similar to Fig. 3 but illustrating the collet in a contracted position; Figs. 5, 6 and 7 are transverse sections, as indicated by the lines 5—5, 6—6 and 7—7 of Fig. 2, respectively; Figs. 8 and 9 are diagrammatic views and are illustrative of the type collet formerly in use; Figs. 10 and 11 are diagrammatic views, similar to the views illustrated in Figs. 8 and 9, but illustrating my improved collet; Fig. 12 is a perspective view of a modified form of my improved collet; Fig. 13 is an end elevation of the collet illustrating the collet in its expanded position; Fig. 14 is an end elevation illustrating the collet in a contracted position; Figs. 15, 16 and 17 are transverse sections through the form of collet illustrated in Fig. 12, and are indicated by the lines 15—15, 16—16 and 17—17, of Fig. 12, respectively. Fig. 18 is a diagrammatic view similar to Fig. 10, but illustrating the form of collet shown in Fig. 12.

Heretofore, collets of this type comprised, tubing cut to the required length and then slotted lengthwise from the opposite ends thereof. The alternate slots were arranged to break through alternate ends of the blanks, forming a series of open ended slots. Generally there were three slots extending from each end of the tube, thereby forming three arcuate jaw sections on each end. The collet ends or jaw sections were ground to the taper required to coact with the collet seat, and were then hardened. In such constructions the arcuate jaws, the outer or seat engaging surfaces were of a considerable arcuate length, and as the seats were brought together to contract the jaws, only the edges of each jaw adjacent the slots contacted with the seats, while the inner surface of each jaw contacted with the work only adjacent its center portion or intermediate the slots. The grinding of both the collet jaws and the collet seats was done with utmost regard for accuracy, nevertheless certain discrepancies often resulted, which discrepancies, although small, nevertheless caused inaccuracy in the axial alignment of the work gripped by the collet jaws. Likewise, the internal strength and characteristics of the material in one collet jaw varied from that in another collet jaw, with the result that when the collet was contracted, one jaw was often more flexible than the others, and thereby caused further inaccuracies in the axial alignment of the work.

It is to be conceded that even though the utmost degree of care is used in manufacturing the collet, inaccuracies such as those pointed out above will sometimes be present. However, I find that it is possible to minimize, if not, for all practical purposes, eliminate the inaccuracies in axial alignment of the work, due to the discrepancies or errors in the collet itself. I find that this is accomplished by decreasing the arcuate area of the collet jaws without increasing their number, and I propose to accomplish this by flattening or undercutting a portion of the jaws adjacent the slots. This materially reduces the distance between the points of contact of a jaw with the seat, and lessens or eliminates for practical purposes, the distance separating the center portion of the jaw with the collet seat, bringing the points of contact between the jaw and the seat relatively close to a radial line passing through the point of contact between the jaw and the work. I find that by so constructing my collet the accuracy of accurate alignment of work gripped thereby is greatly enhanced.

Referring again to the drawings, and especially to Fig. 1, where I show my improved collet in use, the collet itself is generally indicated at 10, and is slidably mounted in a suitable sleeve 12, which has a contracted conical inner end surface member 14 rigid therewith, the latter arranged to coact with the bevelled jaw portions 15 of the collet. Slidably mounted in the sleeve 12 is a second sleeve 16, having a conically formed inner surface 17 adapted to coact with the bevelled surface 18 of the collet. A suitable plunger 19, threaded into the sleeve 12, urges the sleeve 16 against the collet, bringing the bevelled surfaces 18 and 17 together, thereby contracting the ends of the collet. The plunger 19 is provided with a suitable hand wheel 20, by means of which it may be rotated within the sleeve 12, to bring the sleeve toward or away from the collet as desired. The sleeve 12 is in turn rotatably mounted in a suitable carriage or head 21, which is provided with the usual feeding and indexing means, whereby the work such as an automotive valve 50, may be placed in proper relation to a tool, such as a grinding wheel, (not shown). The sleeve 12 is provided with a suitable pulley 22, rigidly secured thereto, by means of which the sleeve with its associated collet 10 and work 50 may be rotated.

The collet 10 is best illustrated in Figs. 2 to 7, inclusive, and as shown, comprises a tube 30, having a series of slots 31 cut in the walls thereof. The alternate slots extend through alternate ends of the collet, forming at each end thereof a series of clamping jaws 32. To increase the flexibility of the body of the collet and enable the jaws 32 to be contracted with a minimum amount of distortion of the collet itself, I undercut the inner and outer surfaces of the collet intermediate its ends, as indicated at 33 and 34, respectively, in Fig. 7. The inner surfaces 37 of the jaws 32 are arcuately ground relative to the axis of the collet, while the outer surfaces of the jaws are tapered, as indicated at 36, by a grinding operation and are so tapered as to be in accurate axial alignment with the axis of the collet and are arranged to contact with the collet clamping seats 14 and 17.

To decrease the error in the alignment of the work gripped by the collet, due to the inaccuracies introduced into the collet by the grinding operation, and the errors due to variations in the internal strength and characteristics of the metal which comprises the jaws of the collet, I flatten the jaws adjacent the slots, as shown at 40 in Figs. 2, 3 and 4. These flattened portions are tapered at a more acute angle relative to the axis of the collet than is the seat taper 36, thereby restricting the contact between the jaws and the seats 14 and 17 to the now restricted tapered portions 36.

The advantages of this construction are brought out in the diagrammatic Figures 8 to 10, inclusive. In these diagrams Figs. 8 and 9 are representative of the ordinary type collet, while Figs. 10 and 11 are corresponding representations of my improved collet. Figs. 8 and 10 diagrammatically represent an end or view of the jaws of the ordinary collet and my improved collet, respectively. In both instances the jaws are arranged for the same maximum outside diameter in the expanded position. The tapered surfaces of these jaws are represented at 39 and the flattened surfaces of my improved collet jaw is indicated at 40. Figs. 9 and 11 are diagrammatic illustrations or views of my improved collet and the ordinary collet, respectively, illustrating their positions relative to a seat 45 and a piece of work W.

Fig. 9 represents the ordinary collet, having jaws A, B and C, while Fig. 11 represents my improved collet, having jaws A', B' and C'. Each of the latter being provided with flattened surfaces 40. In these figures the jaws A and A' are shown distorted, due either to errors in grinding of the jaws or seats or the difference in the flexibility of the metal comprising the jaws. The points of contact between the jaw A and the seat 15 is indicated at $a$ and $b$ in Fig. 9 and $a'$ and $b'$ in Fig. 11, while the point of contact between the jaw and the work is indicated at $d$ in both figures. In Fig. 9 it will be noted that due to errors in grinding or the flexing of the metal in the jaw A, that the distance $e$ between the jaw and the collet is considerably less than the distance $f$ between the jaws B and C and the collet seat. This throws the center of the work W away from the axis of rotation X and towards the jaw A to the point Y, thereby throwing the work out of axial alignment with the collet. As the operation performed on the work, generally a cutting or a grinding operation, will be coaxial with the axis of rotation of the collet and its spindle, the result is that this operation or cut performed on the work is not coaxial with that part of the work gripped by the collet.

In my improved collet, I have lessened and eliminated for practical purposes, the inaccuracies in alignment, due to the errors in grinding or flexibility of the collet. In Fig. 11 it will be noted that the points of contact between A' and B', between the collet and the seat 15, have been brought relatively close together, and by reducing the bridge between these points I have greatly reduced the tendency of the jaw A to flex. Likewise, because the points of contact have been brought together, the distances $e$ and $f$ have been, for all practical purposes, eliminated. Hence, the center of the work W will be coaxial with the center of rotation of the collet and seat 15.

Fig. 12 illustrates a modified form of my improved collet, in which the jaws adjacent the slot are undercut, rather than flattened. This is highly desirable if the collets were used in conjunction with certain types of chucks, wherein a collet having flat surfaces would have so much metal cut away at the edge of the jaws that it slips through the opening at the front end of the chuck. However, by undercutting the curved surface of the jaws, the width of the spherical seats may be varied, as desired, without increasing the width of the slots. This modified form of the collet is best illustrated in Figs. 12 to 18, inclusive, and comprises a tube $30a$, having a series of slots $31a$, cut in the walls thereof, the alternate slots extending through alternate ends of the collet, forming at each end thereof a series of clamping jaws $32a$. The inner surfaces $37a$ of the jaws $32a$ are accurately ground relative to the axis of the collet, while the outer surfaces of the jaws are tapered, or otherwise shaped to fit the seats as indicated at $36a$, by a grinding operation, and are so formed as to be in accurate axial alignment with the axis of the collet.

In this modified form of collet, I prefer to decrease the error in alignment of the work, due to inaccuracy introduced in the grinding operation, as heretofore mentioned, by cutting away the surfaces of the jaws adjacent the slots, instead of flattening the jaws, as heretofore described and shown in connection with Figs. 1 to 11, inclusive. The cut away or low portions of the jaws are shown at 50 in Figs. 12, 13, 14 and 18, and lie adjacent the slots which pass through that end of the collet. Intermediate the low portions of each jaw and midway between the adjacent slots is a bridge of metal 51, which bridge is bevelled or shaped to conform and contact with the seats 14 and 17 of the collet clamping mechanism. The low portions 50 are of a sufficient depth to prevent contact between the jaws and the collet seats, except at the bridge portions 51, in any expanded or contracted position of the collet.

The advantage of this construction is brought out in the diagrammatic Figure 18. This figure diagrammatically represents the modified form of collet in use. The seat is indicated at 60 and the work at W, while the low portions of the jaws are represented at 50. It will be noted from this figure that the collet $10a$ contacts with the seat 60 only at the bridge portion 51, and the bridge portions 51 are of such a width that the points of contact $a''$ and $b''$, between any collet jaw and the seat 60 are relatively close together and substantially in line with the point of contact $d''$, between the work and the inner seat of the collet. Hence, by reducing the width of the bridge between the points of contact of the collet with the collet seat, I have greatly reduced the tendency of the jaw A'' to flex. Likewise, because the points of contact have been brought together, the alignment of the work gripped by the collet is greatly enhanced, as heretofore described, in connection with the collet shown in Figs. 1 to 7, inclusive.

It is to be noted that in the form of collet shown in Figs. 12 to 18, bridge portions 51 of the collet seat may be increased or decreased in width as desired, without affecting the width of the slots $31a$, while, in the instance of the form of collet shown in Figs. 1 to 11, in order to decrease the width of the bridge portions by flattening the ends of the collet, it would, beyond a certain limit, increase the width of the slot 31 of the collet, thereby decreasing the effectiveness of the collet by cutting away too much metal from the ends thereof.

From the foregoing, it will be seen that I have provided a collet, in which the ordinary errors, due to inaccurate grinding and variations in internal structure of the metal of the collet jaws, will not affect the axial alignment between the work and the axis of rotation of the collet.

I claim:

1. A collet for use with opposed relatively movable sockets having substantially conical internal seats, comprising a tubular member having slots extending longitudinally therethrough from opposite ends and extending to a point a fixed distance from the other end of the member, said member having the ends thereof bevelled to correspond with the seat, and wherein the bevelled portions are cut away on the outer surface of the collet adjacent the open ends of the slots, to reduce the width of the seat contact area of the collet for all diameters of work.

2. A chucking member of the type described, adapted to be retained between relatively movable sockets having substantially conical seats, said member comprising a tube having slots, each succeeding slot extending through alternate ends of the tube, substantially conical surfaces adjacent the ends of the tube and adapted to coact with the seats and wherein the outer conical surfaces of the tube are flattened longitudinally on each side of the open ends of the slots and in a plane normal to the plane of the slot and intersecting the axis extended of the tube and wherein the flat areas are arranged to remain out of contact with the conical socket seat for all operating positions of the collet.

3. A collet of the type used to grip various diameters of work and which is used with opposed relatively movable sockets one of which has a substantially conical seat, said collet comprising a tubular member having slots extending longitudinally therethrough from one end and nearly the entire length thereof, and forming a series of jaws on one end of the member, the outer periphery of each of said jaws formed with a plurality of longitudinally extending surface areas of different characteristics, the surface areas adjacent the slots depressed to remain out of contact with the conical sockets for all diameters of work, and the median surface raised to contact with the conical seat for all diameters of work.

In testimony whereof, I hereunto affix my signature.

EDWIN L. CONNELL.